US011187582B2

(12) United States Patent
Faraji-Dana et al.

(10) Patent No.: US 11,187,582 B2
(45) Date of Patent: Nov. 30, 2021

(54) FOLDED METASURFACE HYPERSPECTRAL IMAGER

(71) Applicant: California Institute of Technology, Pasadena, CA (US)

(72) Inventors: MohammadSadegh Faraji-Dana, Pasadena, CA (US); Ehsan Arbabi, Arcadia, CA (US); Andrei Faraon, La Canada Flintridge, CA (US)

(73) Assignee: CALIFORNIA INSTITUTE OF TECHNOLOGY, Pasadena, CA (US)

( * ) Notice: Subject to any disclaimer, the term of this patent is extended or adjusted under 35 U.S.C. 154(b) by 0 days.

(21) Appl. No.: 16/831,448

(22) Filed: Mar. 26, 2020

(65) Prior Publication Data

US 2020/0348176 A1 Nov. 5, 2020

Related U.S. Application Data

(60) Provisional application No. 62/841,002, filed on Apr. 30, 2019.

(51) Int. Cl.
| | |
|---|---|
| *G01J 3/28* | (2006.01) |
| *G01J 3/18* | (2006.01) |
| *G01J 3/02* | (2006.01) |
| *G02B 1/00* | (2006.01) |
| *G02B 27/10* | (2006.01) |

(52) U.S. Cl.
CPC ............ *G01J 3/2823* (2013.01); *G01J 3/0208* (2013.01); *G01J 3/18* (2013.01); *G02B 1/002* (2013.01); *G02B 27/1006* (2013.01)

(58) Field of Classification Search
CPC ...... G02B 1/002; G02B 1/00; G02B 27/1006; G02B 27/10; G01J 3/2823; G01J 3/18; G01J 3/28; G01J 3/0208; G01J 3/02; G01J 3/00
USPC .......................................................... 359/107
See application file for complete search history.

(56) References Cited

U.S. PATENT DOCUMENTS

| | | | |
|---|---|---|---|
| 7,864,317 B2 | 1/2011 | Bockstaele et al. | |
| 8,390,806 B1 | 3/2013 | Subramanian | |
| 8,477,306 B2 | 7/2013 | Shibayama et al. | |
| 10,725,290 B2* | 7/2020 | Fan | G02B 1/002 |
| 11,092,486 B2 | 8/2021 | Faraji-Dana et al. | |
| 2014/0071449 A1* | 3/2014 | Robinson | G01J 3/36 356/328 |
| 2017/0030773 A1 | 2/2017 | Han et al. | |
| 2018/0045953 A1* | 2/2018 | Fan | G02B 5/18 |
| 2018/0252857 A1 | 9/2018 | Glik et al. | |
| 2019/0033129 A1 | 1/2019 | Kim et al. | |
| 2019/0178714 A1 | 6/2019 | Faraji-Dana et al. | |
| 2019/0219447 A1* | 7/2019 | Shaltout | G01N 21/19 |

(Continued)

OTHER PUBLICATIONS

Afridi et al., "Electrically Driven Varifocal Silicon Metalens" ACS Photonics 2018, 5, 4497-4503. 7 pages.

(Continued)

*Primary Examiner* — William R Alexander
(74) *Attorney, Agent, or Firm* — Steinfl + Bruno, LLP

(57) ABSTRACT

Hyperspectal imagers including reflective and transmissive metasurfaces are disclosed. The described metasurfaces are used collectively to disperse and focus light of different wavelengths and incident angles on a focal plane. The disclosed devices are compact and light, and can be used in systems and applications requiring stringent form factors.

14 Claims, 18 Drawing Sheets

(56) References Cited

U.S. PATENT DOCUMENTS

| | | |
|---|---|---|
| 2019/0353522 A1 | 11/2019 | Scholtz et al. |
| 2020/0025610 A1* | 1/2020 | Chandrasekar ....... G01J 3/0237 |
| 2020/0072668 A1 | 3/2020 | Han et al. |
| 2021/0088381 A1* | 3/2021 | Scholtz ................. G01J 3/0218 |

OTHER PUBLICATIONS

Aieta F et al., "Aberration-free ultrathin flat lenses and axicons at telecom wavelengths based on plasmonic metasurfaces." Nano Letters12, 4932-4936 (Aug. 2012). 5 pages.

Arbabi, A. et al. "Controlling the phase front of optical fiber beams using high contrast metastructures" In 2014Conference of Lasers and Electro-optics(CLEO), (2014). 2 pages.

Arbabi, A. et al. "Dielectric metasurfaces for complete control of phase and polarization with subwavelength spatial resolution and high transmission" Nature Nanotechnology10, 937-943 (Nov. 2015). 8 pages.

Arbabi, A. et al., "Fundamental limits of ultrathin metasurfaces" Scientific Reports7, 43722 (Mar. 2017). 9 pages.

Arbabi, A. et al. "Increasing efficiency of high-NA metasurface lenses (conference presentation)" In SPIE OPTO, 101130K-101130K (International Society for Optics and Photonics, 2017).

Arbabi A. et al. "Miniature optical planar camera based on a wide-angle metasurface doublet corrected for monochromatic aberrations." Nature Communications7, 13682 (Nov. 2016). 9 pages.

Arbabi, A. et al. "Planar metasurface retroreflector" Nature Photonics11, 415-420, (Jul. 2017). 7 pages.

Arbabi E et al., "Controlling the sign of chromatic dispersion in diffractive optics with dielectric metasurfaces." Opticavol. 4, 625-632 (Jun. 2017). 8 pages.

Arbabi, E., et al. "Multiwavelength polarization-insensitive lenses based on dielectric metasurfaces with meta-molecules", Optica3, 628-633 (Jun. 2016).6 pages.

Arce et al., "Compressive Coded Aperture Spectral Imaging" IEEE Signal Processing Magazine. 2014. 11 pages.

Azana J et al., "Real-time optical spectrum analysis based on the time-space duality in chirped fiber gratings." IEEE Journal of Quantum Electronics36, 517-526 (May 2000). 10 pages.

Backlund, M.P. et al. "Removing Orientation-Induced Localization Biases in Single-Molecule Microscopy Using a Broadband Metasurface Mask" Nature Photonics10, 459-462 (Nov. 2016). 14 pages.

Bekele, D. et al., "Polarization-independent wideband high-index-contrast grating mirror." IEEE Photonics Technology Letters27, 1733-1736 (Aug. 2015). 4 pages.

Boldrini et al., "Hyperspectral imaging: a review of best practice, performance and pitfalls for in-line and on-line applications" Journal of Near Infrared Spectroscopy. 20, 483-508 (2012).

Chang-Hasnain, C. J. "High-contrast gratings for integrated opto-electronics." Advances in Optics and Photonics4, 379-440 (2012).

Chong, K. E. et al."Polarization-independent silicon metadevices for efficient optical wavefront control" Nano Letters15, 5369-5374 (Jul. 2015). 6 pages.

Chu, C. H. et al. "Active dielectric metasurface based on phase-change medium." Laser & Photonics Reviews10, 986-994 (2016). 9 pages.

Eismann et al., "Hyperspectral remote sensing" (SPIE, Bellingham, 2012).

ElMasry et al., "Principles of Hyperspectral Imaging Technology" Hyperspectral Imaging for Food Quality Analysis and Control. 2010. 42 pages.

Faklis D. et al., "Spectral properties of multiorder diffractive lenses." Applied Optics34, 2462-2468 (May 1995). 7 pages.

Faraji-Dana et al., "Compact folded metasurface spectrometer" Nature Communications, 2018, 9:4196. 8 pages.

Fattal, D. et al., "Flat dielectric grating reflectors with focusing abilities." Nature Photonics4, 466-470 (May 2010). 5 pages.

Fernandez et al., "Infrared spectroscopic imaging for histopathologic recognition". Nature biotechnology, vol. 23, No. 4. 2005. 6 pages.

Ferrari M et al., "A brief review on the history of human functional near-infrared spectroscopy (fNIRS) development and fields of application." Neuroimage63, 921-935 (Mar. 2012). 15 pages.

Gan X., et al. "A high-resolution spectrometer based on a compact planar two dimensional photonic crystal cavity array." Applied Physics Letters100, 231104 (Jan. 2012). 5 pages.

Gao et al., "Compact image slicing spectrometer (iss) for hyperspectral fluorescence microscopy" Opt. express 17, 122293-12308 (2009).

Gao et al., "Depth-resolved image mapping spectrometer (IMS) with structured illumination" Optics Express, vol. 19, No. 18. 2011. 14 pages.

Gat et al., "Imaging spectroscopy using tunable filters: a review" Proceedings of Spie, Wavelet Applications VII. 2000.

Goetz et al., "Imaging spectrometry for earth remote sensing" Sci. 228, 1147-1153 (1985).

Gowen et al., "Hyperspectral imaging—an emerging process analytical tool for food quality and safety control" Trends in Food Science & Technology 18. 2007. 590-598.

Grabarnik S. et al., "High-resolution microspectrometer with an aberration-correcting planar grating." Applied optics47, 6442-6447 (Dec. 2008). 6 pages.

Gupta et al., "Hyperspectral imager, from ultraviolet to visible, with KDP acousto-optic tunable filter" Applied Optics. vol. 43, No. 13. 2004.

Hagen et al., "Review of snapshot spectral imaging technologies". Optical Engineering. 52(9), Sep. 2013. 24 pages.

Harvey et al., "High-throughput snapshot spectral imaging in two dimensions" Biomedical Optics, 2003. 10 pages.

Horie Y. et al. "Visible wavelength color filters using dielectric subwavelength gratings for backside-illuminated CMOS image sensor technologies." Nano Letters17, 3159-3164 (Apr. 2017). 6 pages.

Hsiao et al., "Fundamentals and Applications of Metasurfaces" Small Methods 2017, 20 pages.

Hunter W. "Diffraction gratings and applications" Optics & Photonics News 8, 52-53 (1997). 2 pages.

International Search Report for International Application No. PCT/US2020/025013 filed on Mar. 26, 2020 on behalf of California Institute of Technology dated Jul. 15, 2020 4 pages.

Jahani S. "All-dielectric metamaterials." Nature Nanotechnology11, 23-36 (Jan. 2016). 14 pages.

Jang, M. et al. "Wavefront shaping with disorder-engineered metasurfaces" Nature Photonics12, 84-91,(Feb. 2018). 8 pages.

Kamali et al., "A review of dielectric optical metasurfaces for wavefront control" Nanophotonics 2018; 7(6): 1041-1068. 28 pages.

Kamali S. et al., "Highly tunable elastic dielectric metasurface lenses." Laser & Photonics Reviews10, 1002-1008 (2016). 17 pages.

Kamali, S. M. et al. "Angle-multiplexed metasurfaces: encoding independent wavefronts in a single metasurface under different illumination angles" Physical Review X7, 041056, (2017). 9 pages.

Kamali, S. M., et al. "Decoupling optical function and geometrical form using conformal flexible dielectric metasurfaces", Nature Communications7, 11618, (May 2016). 7 pages.

Khorasaninejad, M. et al., "Super-dispersive off-axis meta-lenses for compact high resolution spectroscopy." Nano Letters16, 3732-3737 (Apr. 2016). 6 pages.

Kildishev A., et al. "Planar photonics with metasurfaces." Science339, 1232009 (Mar. 2013). 8 pages.

Kim et al., "Design and fabrication of a 900-1700 nm hyper-spectral imaging spectrometer" Optics Communications 283 (2010) 355-361. 7 pages.

Kruk et al., "Functional Meta-Optics and Nanophotonics Governed by Mie Resonances" ACS Photonics, 2017. 4, 2638-2649.

Kruk et al., "Transparent Dielectric Metasurfaces for Spatial Mode Multiplexing" Laser Photonics Rev. 2018, 12. 6 pages.

Lalanne et al., "Blazed binary subwavelength gratings with efficiencies larger than those of conventional echelette gratings" Optics Letters., vol. 23, No. 14. 1998. 3 pages.

Lalanne, P. et al. "Metalenses at visible wavelengths: past, present, perspectives" Laser & Photonics Reviews11 (2017). 17 pages.

(56) References Cited

OTHER PUBLICATIONS

Lewis et al., "Fourier Transform Spectroscopic Imaging Using an Infrared Focal-Plane Array Detector" Anal. Chem. 1995, 67, 3377-3381. 5 pages.
Li Jia et al., "Broadband metasurfaces for independent control of reflected amplitude and phase". AIP Advances 6, 045024 (2016). 7 pages.
Liang et al., "Advances in multispectral and hyperspectral imaging for archaelogy and art conservation" Appl. Phys. A 106, 309-323 (2012).
Lim et al., "Spatial scanning hyperspectral imaging probe for bio-imaging applications" Rev. Sci Instrum. 87. 2016. 8 pages.
Lin, D. et al. "Dielectricgradient metasurface optical elements" Science345, 298-302 (Jul. 2014). 6 pages.
Liu et al., "Broadband Metasurfaces with Simultaneous Control of Phase and Amplitude" Advanced Materials. 2014, 26, 5031-5036. 6 pages.
Liu V., et al. "S4: A free electromagnetic solver for layered periodic structures" Computer Physics Communications183, 2233-2244,(May 2012). 11 pages.
Lu et al., "Medical hyperspectral imaging: a review" Journal of Biomedical Optics 19(1), 2014.
Miyamoto K. "On the design of optical systems with an aspheric surface." Journal of the Optical Society of Americas51, 21-22 (Jan. 1961). 2 pages.
Mohammadsadegh F. et al., "Compact folded metasurface spectrometer" Nature Communications 2018 pp. 1-8.
Moitra, P. et al., "Experimental demonstration of a broadband all-dielectric metamaterial perfect reflector". Applied Physics Letters104, 171102 (Apr. 2014). 6 pages.
Momeni B. et al., "Integrated photonic crystal spectrometers for sensing applications." Optics Communications282, 3168-3171 (2009). 4 pages.
Morris et al., "Imaging spectrometers for fluorescence and raman microscopy: acuosto-optic and liquid crystal tunable filters", Society for Applied Spectroscopy. vol. 48, No. 7, 1994.
Mouroulis et al., "Design of pushbroom imaging spectrometers for optimum recovery of spectroscopic and spatial information" Applied Optics, vol. 39, No. 13. 2000. 12 pages.
Nitkowski A. et al., "Cavity-enhanced on-chip absorption spectroscopy using microring resonators." Optics Express16, 11930-11936 (2008). 7 pages.
Paniagua-Dominguez, R. et al. "A Metalens with Near-Unity Numerical Aperture" Nano Letters18, 2124-2132, (2018).
Pervez, N. K. et al. "Photonic crystal spectrometer." Optics Express18, 8277-8285 (Apr. 2010). 9 pages.
Pors, A. et al., "Random-phase metasurfaces at optical wavelengths." Scientific Reports6, 28448, (Jun. 2016). 10 pages.

Redding, B et al., "Compact spectrometer based on a disordered photonic chip." Nature Photonics7, 746-751 (Sep. 2013). 6 pages.
Sell, D et al., "Large-angle, multifunctional metagratings based on freeform multimode geometries." Nano Letters17, 3752-3757 (May 2017). 6 pages.
Shaw et al., "Spectral Imaging for Remote Sensing" Lincoln Laboratory Journal, vol. 14, No. 1, 2003. 26 pages.
Tack et al., "A compact, high-speed, and low-cost hyperspectral imager" Proceedings of Spie. 2012. 14 pages.
Thomas, C. E. "Optical spectrum analysis of large space bandwidth signals." Applied Opticsvol. 5, 1782-1790 (Nov. 1966). 9 pages.
Voloshinov et l., "Improvement in performance of a TeO2 acousto-optic imaging spectrometer" Journal of Optics A: Pure and Applied Optics 9. (2007) 341-347. 8 pages.
Wagadarikar et al., "Single disperser design for coded aperture snapshot spectral imaging" Applied Optics. vol. 47, No. 10. 2008. 9 pages.
Wang et al., "Grayscale transparent metasurface holograms" Optica, vol. 3, No. 2. 2016. 2 pages.
Wang et al., "MEMS scanner enabled real-time depth sensitive hyperspectral imaging of biological tissue" Optics Express. 2010.
Wang, S.-W. et al. "Concept of a high-resolution miniature spectrometer using an integrated filter array." Optics Letters32, 632-634 (Mar. 2007). 3 pages.
Written Opinion for International Application No. PCT/US2020/025013 filed on Mar. 26, 2020 on behalf of California Institute of Technology dated Jul. 15, 2020 8 pages.
Xia, Z. et al. "High resolution on-chip spectroscopy based on miniaturized microdonut resonators" Optics Express19, 12356-12364, (Jun. 2011). 9 pages.
Yang, Y. et al. "Nonlinear fano-resonant dielectric metasurfaces." Nano Letters15, 7388-7393 (Oct. 2015). 6 pages.
Yu, N., et al. "Flat optics with designer metasurfaces" Nature materials13, 139-150, (Jan. 2014). 12 pages.
Zhan, A. et al. "Low-contrast dielectric metasurface optics." ACS Photonics3, 209-214 (Feb. 2016). 6 pages.
Zhou et al., "Multilayer Noninteracting Dielectric Metasurfaces for Multiwavelength Metaoptics" Nano Letters, 2018, 7529-7537. 9 pages.
Zhou, Z. et al. "Efficient silicon metasurfaces for visible light." ACS Photonics4, 544-551 (Jan. 2017). 8 pages.
Non-Final Office Action for U.S. Appl. No. 16/213,810, filed Dec. 7, 2018 on behalf of California Institute of Technology, dated Dec. 18, 2020. 19 Pages.
Notice of Allowance for U.S. Appl. No. 16/213,810, filed Dec. 7, 2018 on behalf of California Institute of Technology dated Apr. 13, 2021 9 pages.

\* cited by examiner

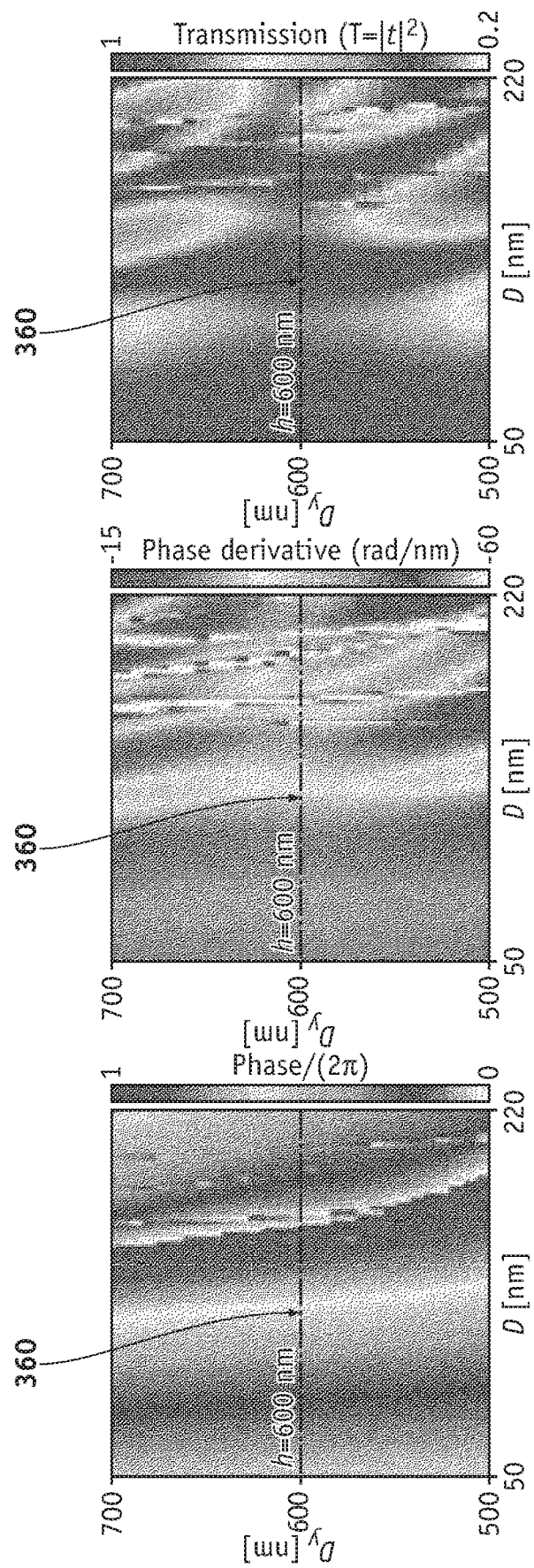

FOLDED METASURFACE HYPERSPECTRAL IMAGER

CROSS REFERENCE TO RELATED APPLICATIONS

The present application claims priority to U.S. Provisional Patent Application No. 62/841,002 filed on Apr. 30, 2019 and may be related to U.S. Pat. Pub. No. 2019-0178714 pub-lished on Jun. 13, 2019, entitled "Compact Folded Metasurface Spectrometer" both of which are incorporated herein by reference in their entirety.

FIELD

The present disclosure is related to hyperspectral imaging, and more particularly to line-scanning folded hyperspectral imagers including reflective and transmissive metasurfaces used to collectively disperse and focus light of different wavelengths and incident angles on a focal plane.

BACKGROUND

Hyperspectral imaging, originally developed and utilized in remote sensing, is a technique with applications in numerous areas of science and engineering such as archaeology, chemistry, medical imaging, biotechnology, biology, biomedicine, and production quality control. In general, a hyperspectral imager (HSI) captures the spectral data for every point in an image. Therefore, the hyperspectral data for a 2D image is a 3D cube in which the first two dimensions are the spatial directions and the third one represents the spectrum.

Several methods and HSI platforms have been developed to acquire the 3D data cube using the existing 2D image sensors. One category of HSIs use tunable band-pass filters that can sweep through the desired spectral band. In these devices, a 2D image is captured at each step in the scan, recording the optical power within the filter bandwidth. The required spectral scanning setups usually rely on a fine tuning mechanism that might not be fast or compact enough for many applications. A significant effort has been made to develop HSIs with faster and more compact spectral scanning schemes and lower aberrations. While acousto-optical and liquid crystal tunable filters provide solutions for fast spectral scanning, their low-throughput (under 50%) is still a disadvantage of these tunable filters.

Another class of devices, snapshot HSIs, acquire the 3D data cube in a single shot without the need for a scanning mechanism. However, they generally require heavy post-processing and rely on some sort of sparsity in the spectral and/or spatial content of the image [as they are, in essence, compressive sensing methods. While their higher data rates and speeds make them suitable for recording transient scenes, they generally suffer from low signal to noise ratios (SNR), and require significant computational resources. Snapshot image mapping spectrometers (IMS), based on the idea of image slicing and dispersing each slice to obtain the spectral information and reconstruct the 3D data cube, work well only for low spatial resolution applications. Additionally, the image mapper which is the primal part of IMS hyperspectral imaging systems needs to cut the scene with a high precision and are not often compact.

A different group of HSIs are based on spatial scanning, and require a relative displacement of the HSI and the object of interest (i.e., either the object or the HSI is moved in space). The spatial scanning is either done pixel by pixel (point scanning/whisk-broom) or line by line (push-broom) using a slit in front of the HSI. The whisk-broom technique requires 2D spatial scanning which results in longer acquisition times in comparison to the push-broom method. Thus, its applications are mostly limited to cases like confocal microscopy where measuring one point at a time while rejecting the signal from other points is of interest. The push-broom HSIs are faster and better-suited for applications such as air- and spaced-based hyperspectral scanning where the whole scene of interest might not be at hand at once. One advantage of push-broom HSIs is that a large number of spectral-bands are captured without the burdensome post processing that is generally required for snapshot HSIs. Moreover, push-broom HSIs generally provide higher SNRs and better angular resolution compared to the snapshot ones. Other approaches that indirectly obtain the 3D data cube, such as interferometric Fourier transform spectroscopic imaging, in general rely on bulky and complicated optical setups, and are not well suited for compact and low-weight systems.

A common challenge with almost all of the mentioned platforms is their compact, robust, and low-weight implementation, limited by the requirement for relatively complicated optical systems and reliance on mostly bulky conventional optical elements.

SUMMARY

The disclosed methods and devices address the described challenges and provide practical solutions to the above-mentioned problems.

In recent years, dielectric optical metasurfaces have overcome some of the limitations faced by the conventional optical elements. Their ability to control the phase, phase and polarization, and phase and amplitude of light on a sub-wavelength scale and in compact form factors has made them very attractive for the implementation of compact optical systems. In addition, the additional available degrees of freedom in their design allow for devices with enhanced control that are otherwise not feasible. The disclosed methods and devices leverage such properties of metasurfaces.

According to a first aspect of the disclosure, a hyperspectral imager (HSI) is provided, comprising: a first mirror with an input aperture and a second mirror with an output aperture, the first and the second mirror facing each other; and a plurality of reflective metasurfaces and a transmissive metasurface, the plurality of reflective metasurfaces and the transmissive metasurface being patterned on a side of the HSI closer to the second mirror, the transmissive metasurface being in correspondence of the output aperture; wherein: the input aperture is configured to input light of separate wavelengths received at incident angles; the first mirror and the second mirror are configured to reflect the light to generate a reflected light; the output aperture is configured to output the reflected light thus generating an output light; and a combination of the plurality of reflective metasurfaces and the transmissive metasurface is configured to split the light into the separate wavelengths and to focus the output light to a plurality of spots on a focal plane.

According to a second aspect of the disclosure, a method of hyper spectral imaging is disclosed, comprising: receiving light through an input aperture of a first mirror; scattering the light off reflective metasurfaces located close to or on a second mirror facing the first mirror; reflecting the scattered light off the first and the second mirror, thereby splitting the scattered light into separate wavelengths, and outputting the light split into separate wavelengths through a transmissive metasurface located close to or on the second mirror via an output aperture of the second mirror.

According to a third aspect of the disclosure, a method of building a hyperspectral sample is disclosed, comprising: providing a one to one correspondence of transmission spectra of a nanopost with dimensions of the nanopost; and fabricating an array of nanoposts based on a set shape with set color variations, and the one to one correspondence.

Further aspects of the disclosure are provided in the description, drawings and claims of the present application.

DESCRIPTION OF THE DRAWINGS

FIG. 3D shows an exemplary transmission phase vs. side-lengths and height of a nanopost according to embodiments of the present disclosure.

FIG. 3E shows an exemplary transmission phase of a nanopost vs. wavelength according to embodiments of the present disclosure.

FIG. 3F shows an exemplary transmission plotted vs. side-length and height of a nanopost according to embodiments of the present disclosure.

DETAILED DESCRIPTION

Figure 1A:
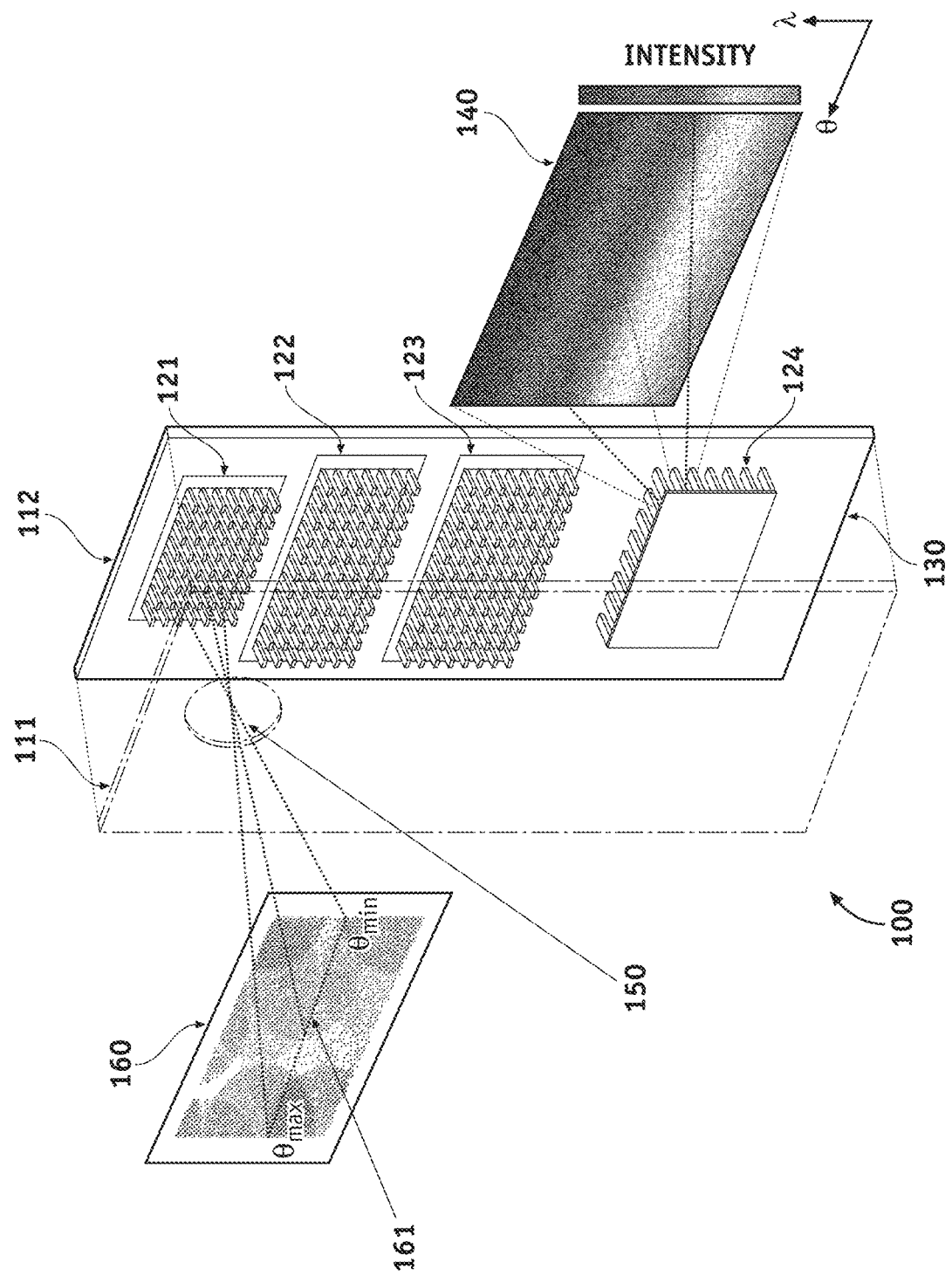
FIGS. 1A-1B show an exemplary HSI in accordance with an embodiment of the present disclosure.
Figure 1B:
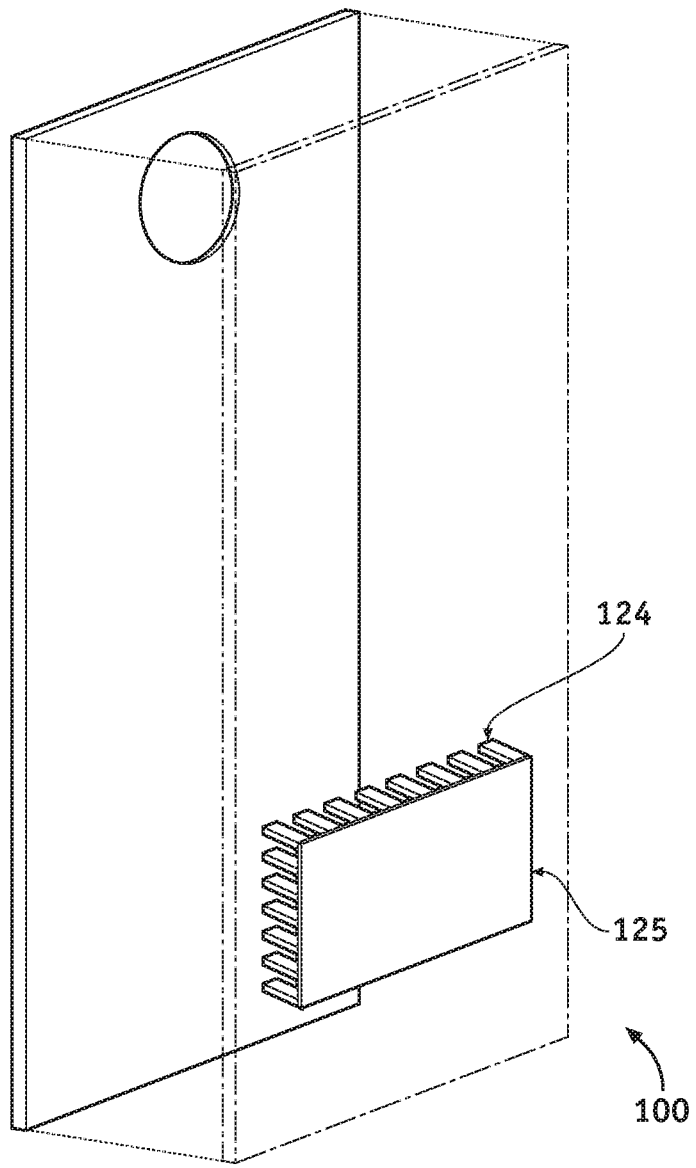

FIG. 1A shows an HSI (100) with folded structure and including a transmissive metasurface (124) and a plurality of reflective metasurfaces (121, 122, 123) patterned on one side of substrate (130) with mirrors (111, 112) on both sides. The reflective metasurfaces (121, 122, 123) may be located close to or on mirror (112). Substrate (130) may be a 1 mm-thick substrate made of a dielectric material (e.g. fused silica) and the mirrors may be made of gold. According to the teachings of the present disclosure, in operating conditions, light enters the HSI (100) through an input aperture (150) located in one of the mirrors (111) and is vertically dispersed by metasurface (121) which acts as first-order blazed grating. A combination of reflective metasurfaces (122, 123) and transmissive metasurface (124) focuses light with different wavelengths and horizontal incident angles to diffraction-limited spots on a detector array plane (140) that is parallel to substrate (130). In other words, light coming from a horizontal line (161) of an image (160) enters input aperture (150) at different angles ranging from $\theta_{min}$ to $\theta_{max}$. As shown in FIG. 1A, different wavelengths are dispersed in the vertical direction (A) onto detector array plane (140), and various input angles are focused to different horizontal points on the detector array plane (140), along the horizontal axis (0). In accordance with embodiments of the present disclosure, HSI (100) may have a spectral and angular resolution of 1.5 nm and 0.075° respectively. HSIs with a volume of less than 10 mm$^3$ (e.g. 6.5 mm$^3$) may be built in accordance with the teachings of the present disclosure. FIG. 1B shows another view of the HSI (100) of FIG. 1A. As shown, light exits the HSI (100) through output aperture (125).

With further reference to FIG. 1A, image (160) is scanned on a line-by-line basis. Each scanned horizontal line (161) of image (160) is mapped into a plane storing spectral information of each point of the horizontal line (161). As such, by moving image (160) vertically and as a result of line by line scanning of image (160), the obtained hyperspectral data for the 2D image (160) will be a 3D cube in which the first two dimensions are spatial directions and the third one represents spectrum. According to an embodiment of the present disclosure, mirror (112) may have an opening aperture (125) (shown in FIG. 1B as noted above) with transmissive metasurface (124) built into the opening aperture (125). As such, light enters the HSI (100) through input aperture (150), interacts with reflective metasurfaces (121, 122, 123) while it is confined inside substrate (130) by mirrors (111, 112), and exits the output aperture (125) through transmissive metasurface (124) to focus onto detector array plane (140). According to embodiments of the present disclosure, HSIs having two or more reflective metasurfaces and a transmissive metasurface may be built, wherein one reflective metasurface of the two or more reflective metasurfaces is implemented as a blazed-grating.

Figure 2:
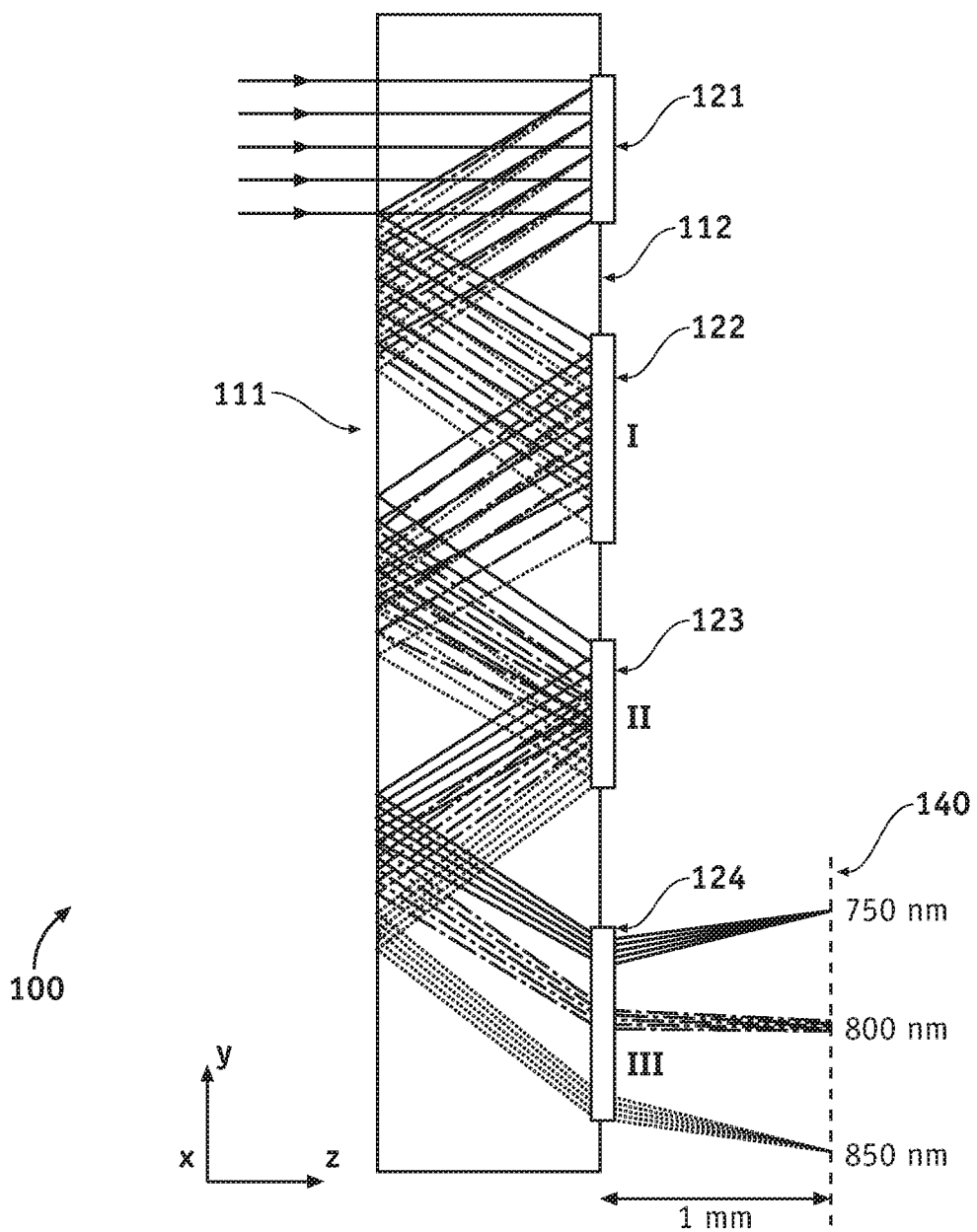
FIG. 2 shows a side view of the HSI of FIG. 1.

FIG. 2 shows a side view of HSI (100) of FIG. 1A. In accordance with further embodiments of the present disclosure, metasurface (121) may be built with a 1-μm period, dispersing the collimated light coming from different angles into angles centered at 33.46 degree (in the y-z plane) at the center wavelength of 800 nm. The phase profiles of metasurfaces (121, . . . , 124) are optimized to provide near diffraction-limited focusing for the 750 nm-850 nm spectral range and ±15 degree spatial range on detector array plane (140). In what follows, exemplary embodiments will further describe the function and structure of metasurfaces presented in the disclosure.

As described in U.S. Pub. Pat. No. 2019-0178714 mentioned above, each of metasurfaces (121, . . . , 124) comprises a plurality of nanoposts. FIG. 3A shows an exemplary unit cell (300A) used to implement each of the constituent nanoposts (301A) of reflective metasurfaces (121, 122, 123) of FIG. 1A. Unit cell (300A) may comprise an α-Si nanopost (301A) with rectangular cross-section, resting on a 1-mm-thick fused silica substrate (303A) and capped by a thick SU-8 layer (302A). The height and lattice constant of the nanoposts may be 395 nm and 246 nm respectively, and a gold (or suitable reflective) layer (304A) is deposited on the SU-8 layer (302A) to make the metasurfaces (121, 122, 123) of FIG. 1A reflective.

Figure 3B:
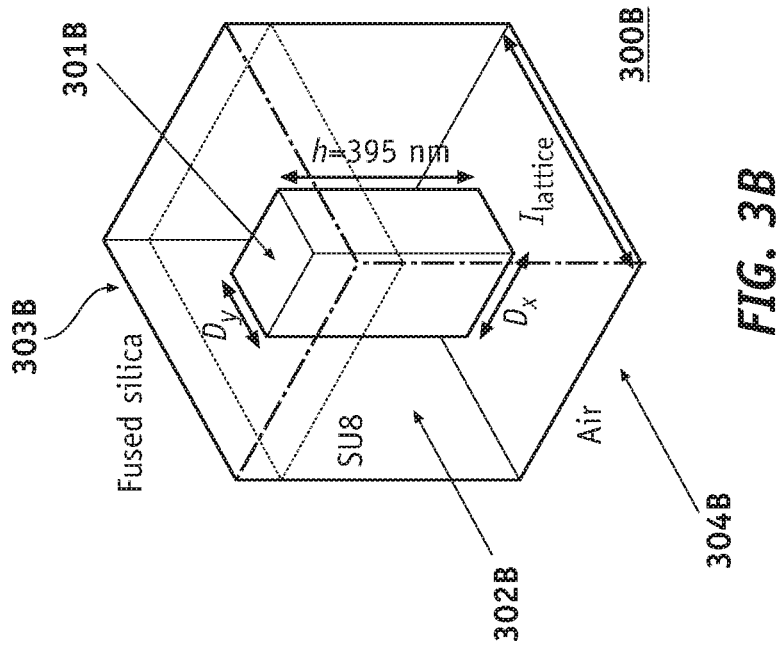
FIGS. 3A-3B show exemplary unit cells in accordance with embodiments of the present disclosure.
Figure 3A:
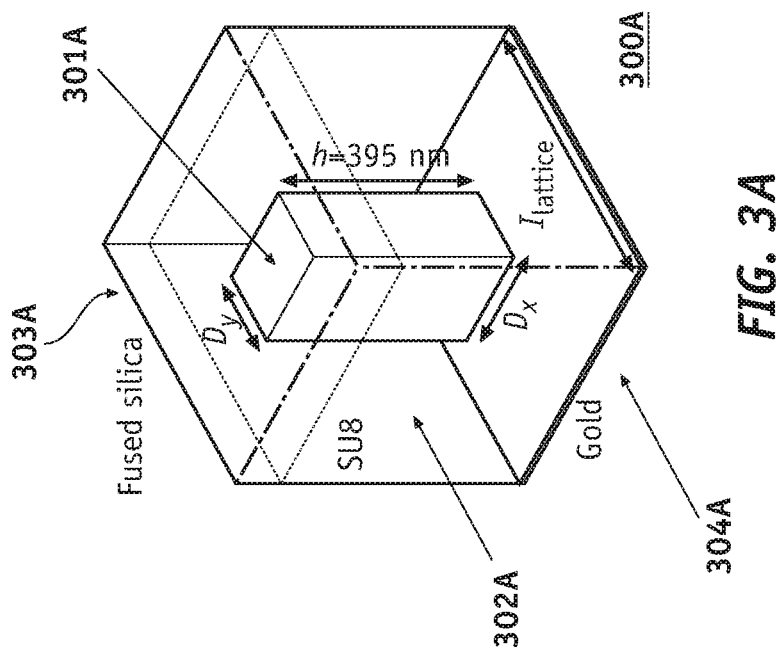

FIG. 3B shows an exemplary unit cell (300B) used to implement each of the constituent nanoposts (301B) of transmissive metasurface (124) of FIG. 1A. Unit cell (300B) comprises an α-Si nanopost (301B) with rectangular cross-section, resting on a 1-mm-thick fused silica substrate (303B) and capped by a thick SU-8 layer (302B). The height and lattice constant of the nanoposts may be 600 nm and 250 nm, respectively, without the presence of a gold layer when compared with FIG. 3A. As mentioned before with regards to FIGS. 1A and 1B, light exits the HSI(100) of FIG. 1A through output aperture (125) of FIG. 1B. This is shown by the presence of an air interface (304B) instead of gold layer (304A) previously shown in FIG. 3A.

With further reference to FIGS. 3A-3B, the nanopost heights are, both in the reflective and transmissive cases, chosen to achieve full 2π phase coverage, while minimizing the variation in the wavelength derivative of phase to keep the diffraction efficiency high over the required bandwidth of operation. In other words, in this case, the derivative of the phase of the reflected light with respect to the wavelength is kept substantially equal to a constant. In addition, the lateral dimensions of the nanoposts are selected to render the metasurfaces polarization independent for a set or desired operation angle (e.g. 33.46 degrees as described in the embodiment of FIG. 2). The metasurface (121), acting as a blazed grating, may be built to exhibit a 1-μm period consisting of four nanoposts located on a lattice with 250 nm lattice constant.

With continued reference to FIGS. 3A-3B, the person skilled in the art will understand that the above-mentioned dimensions are exemplary dimensions. Embodiments in accordance with the present disclosure having dimensions different from the ones mentioned above may also be envisaged. Similarly, and depending on the application, properly selected materials different from the exemplary materials described above may also be used to build various embodiments in accordance with the teachings of the present disclosure.

Figure 3C:
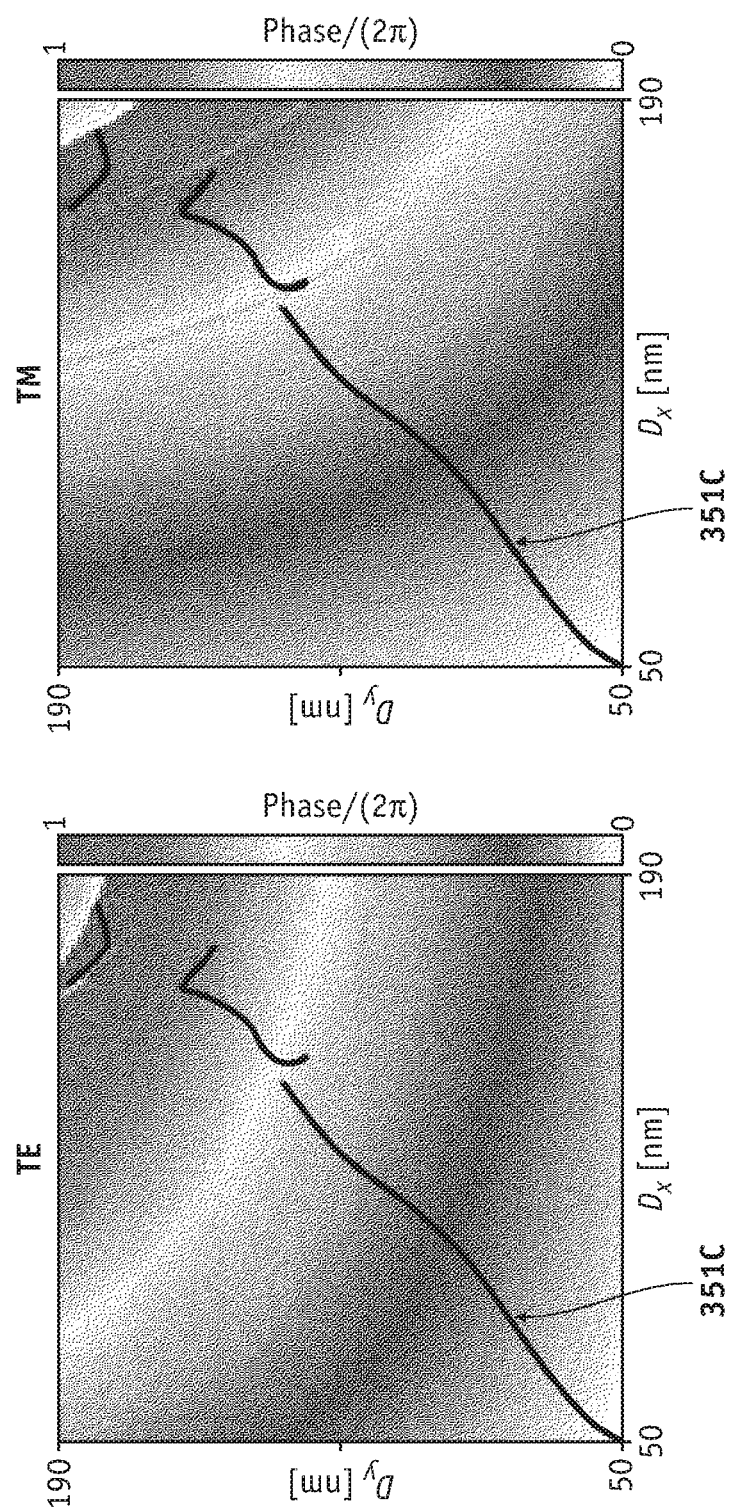
FIG. 3C shows an exemplary transmission phase vs. side-lengths of a nanopost according to embodiments of the present disclosure.

FIG. 3C shows the transmission phase of the nanopost (301B) of FIG. 3B for an incident angle of 33.46 degrees versus the side lengths of nanopost (301B) for TE and TM polarizations respectively. The solid curves (351C, 352C) show the path in the Dx-Dy plane where nanoposts (301B) have the same transmission phase for TE and TM polarization.

FIG. 3D shows transmission phase of nanopost (301B) of FIG. 3B having a square cross-section, and plotted vs. the side-length and the height of nanopost (301B) for TE polarization. FIG. 3E shows the phase derivative of nanopost (301B) of FIG. 3B having a square cross-section with respect to the wavelength of operation. Lines (360) show the height (600 nm) where phase derivative variation is minimal. FIG. 3F shows the transmission plotted vs. the side-length and the height of nanopost (301B).

Figure 4:
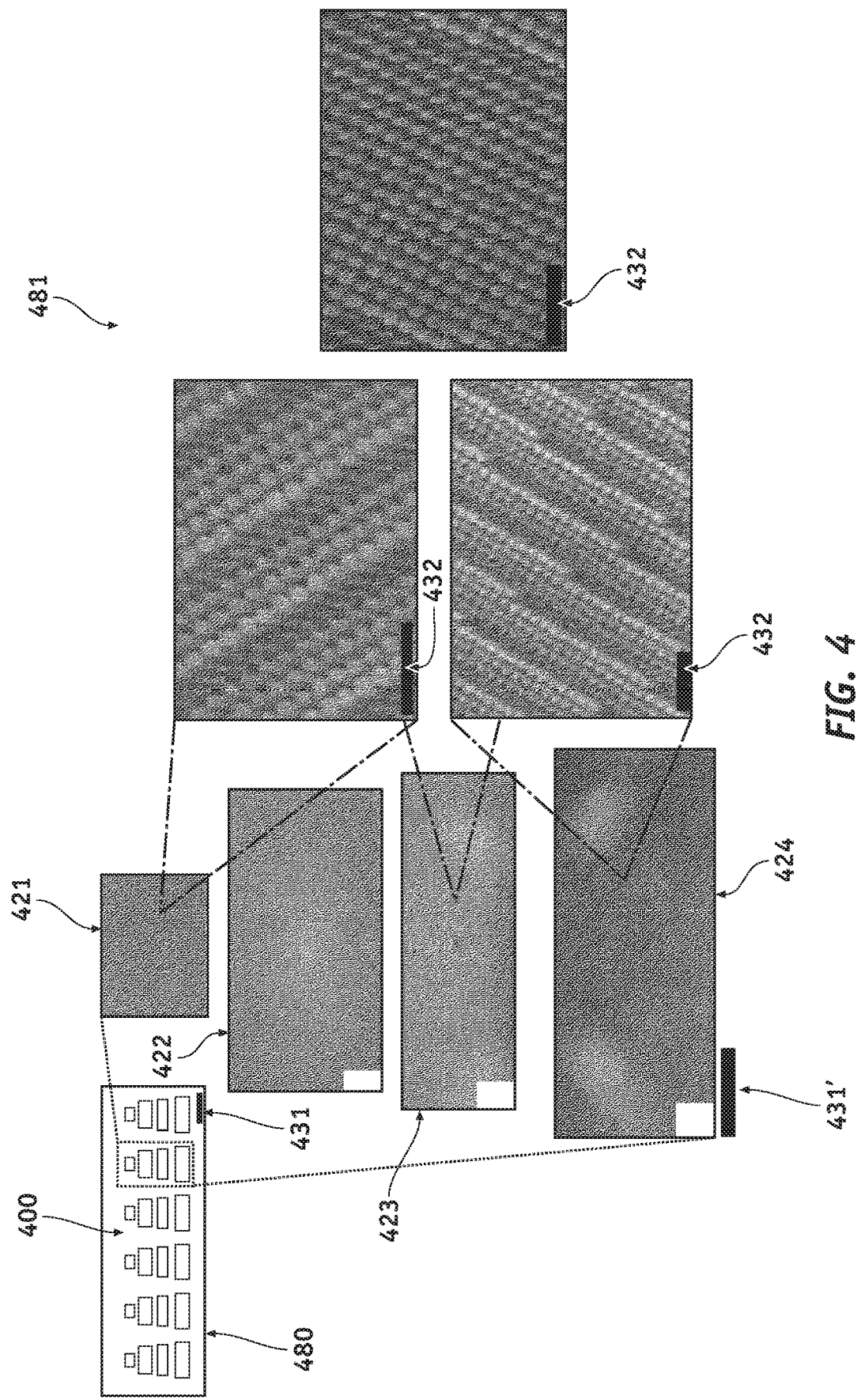
FIG. 4 shows an exemplary implementation of six HSIs integrated on the same chip

FIG. 4 shows an exemplary implementation of six HSIs (400) integrated on the same chip (480), in accordance with the teachings of the present disclosure. Reflective metasurfaces (421, 422, 423) and transmissive metasurface (424) of each HSI (400), together with scanning electron micrographs (481) of parts of the metasurfaces (421, ..., 424) are also shown in FIG. 4. Scale bars (431, 431', 432) represent 1 mm, 500 μm, and 1 μm respectively. The person skilled in the art will appreciate that, being compact, low-weight, and easy to fabricate and integrate with image sensors and electronics, the metasurface HSI opens up new opportunities for utilizing hyperspectral imaging where strict volume and weight constraints exist. In addition, the teachings of the present disclosure exemplify the utilization of metasurfaces as high-performance diffractive optical elements for implementation of advanced optical systems.

Figure 5A:
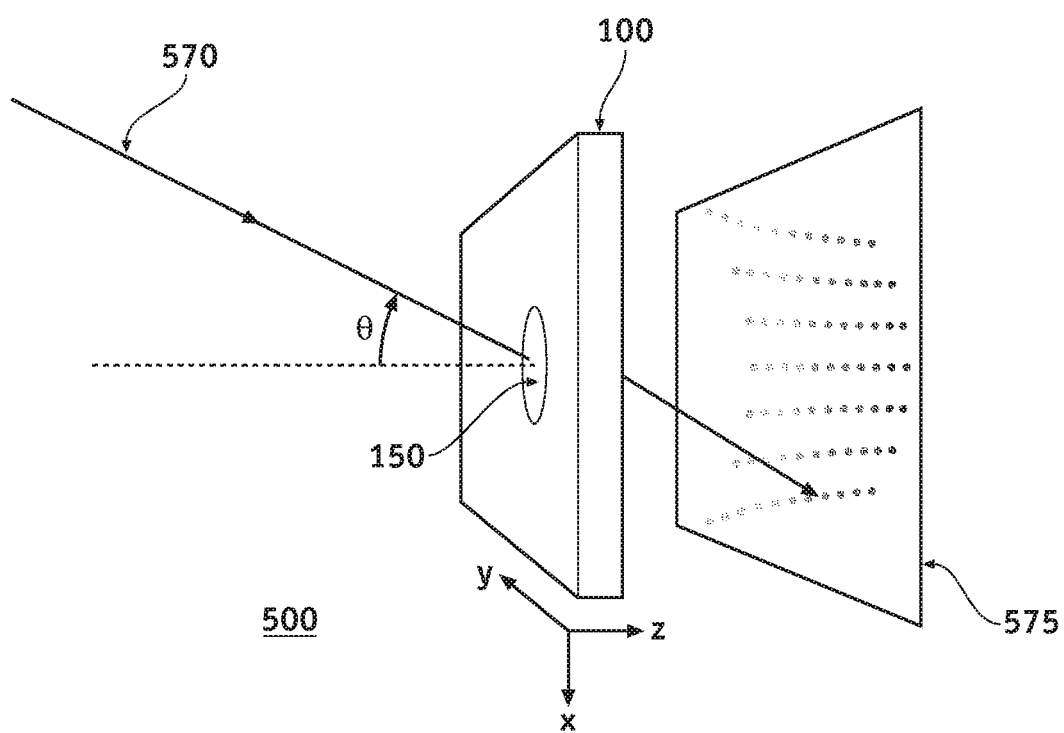
FIG. 5A shows a measurement setup used to characterize an HSI according to embodiments of the present disclosure.
Figure 5B:
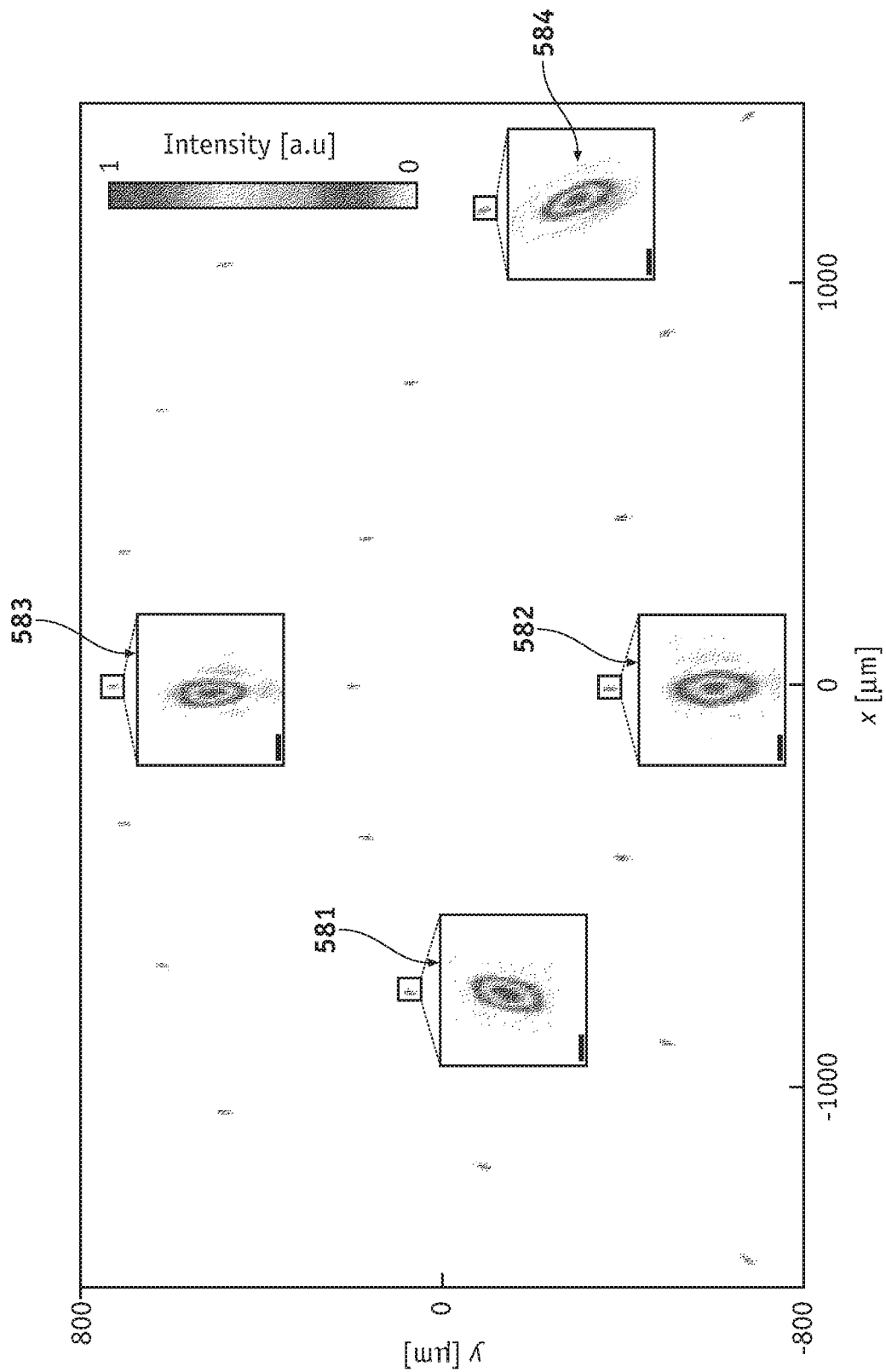
FIG. 5B shows exemplary measured focuses on an image plane according to embodiments of the present disclosure.
Figure 5C:
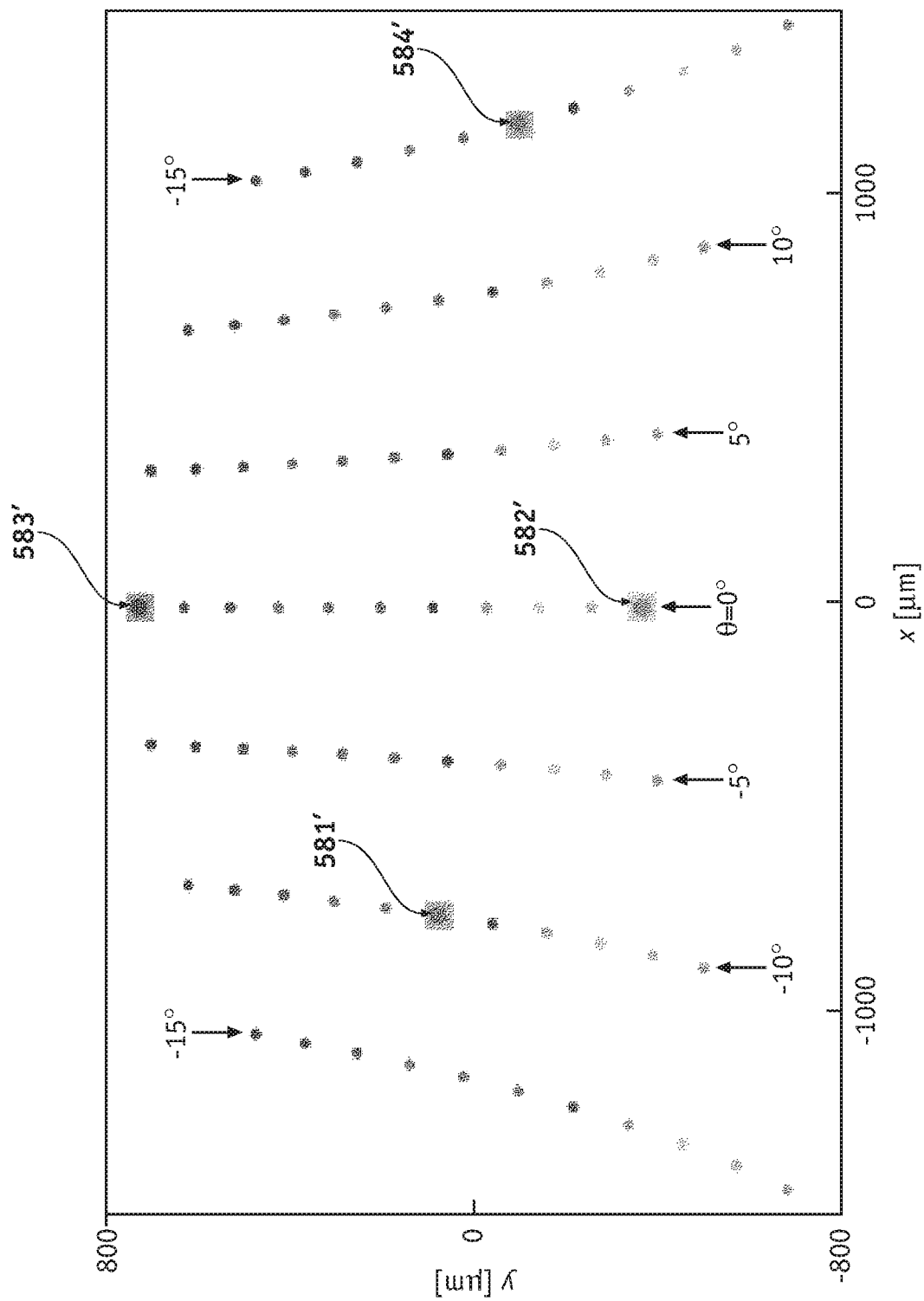
FIG. 5C shows exemplary simulated locations of the focuses on a focal plane according to embodiments of the present disclosure.
Figure 5D:
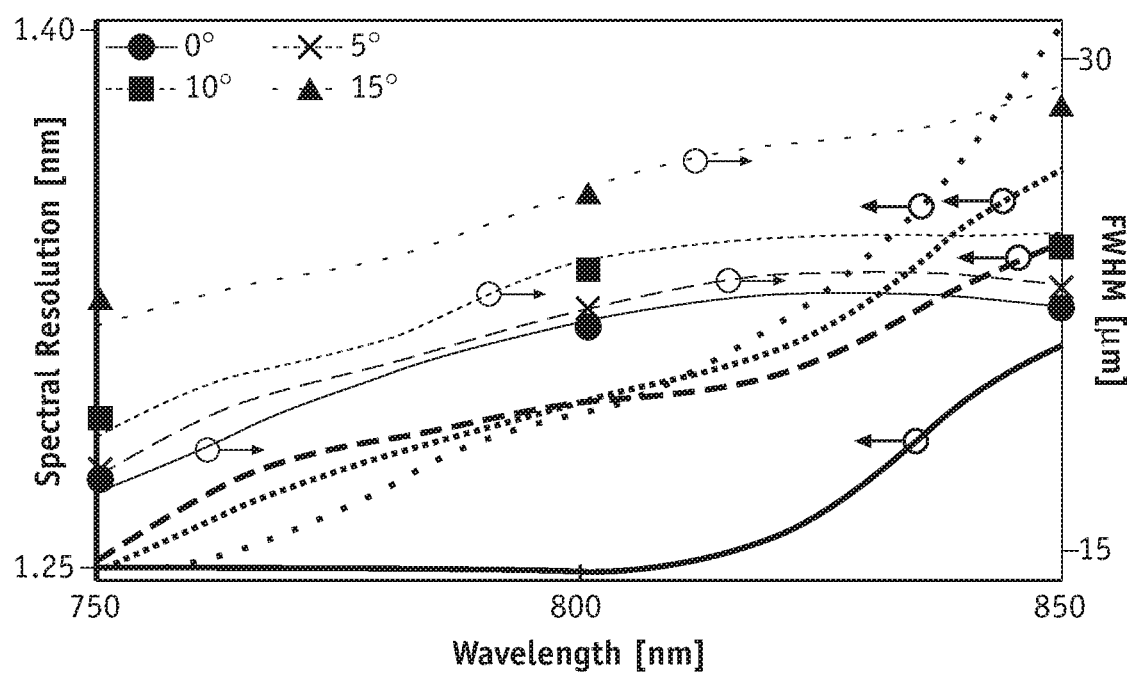
FIG. 5D shows exemplary simulated spectral resolution and vertical full width half maximum (FWHM) versus wavelengths according to embodiments of the present disclosure.
Figure 5E:
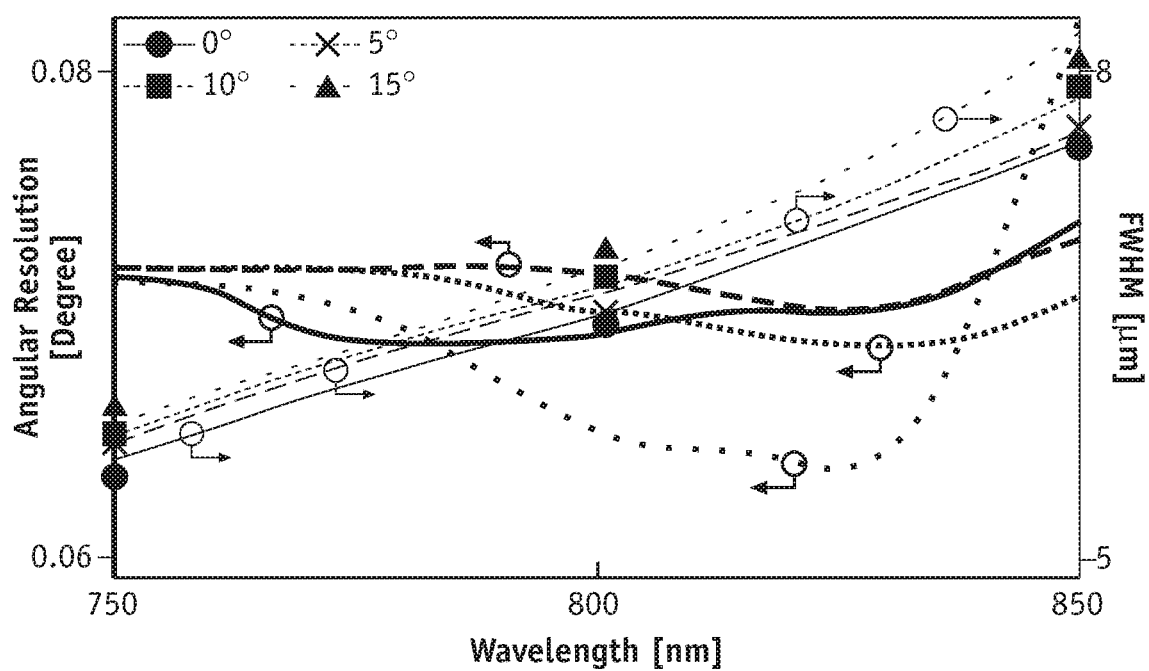
FIG. 5E shows exemplary simulated angular resolution and FWHM versus wavelengths according to embodiments of the present disclosure.

FIG. 5A shows a measurement arrangement (500) used to characterize HSI (100) of FIG. 1A. As shown, the input aperture (150) of the device is illuminated by a collimated beam (570) from a tunable continuous-wave laser (not shown) at various incidence angles (θ) of light (570), and the intensity distributions at focal plane (575) are captured. FIG. 5B shows measured focuses on the image plane (575), shown for three wavelengths (750, 800, and 850 nm) and angles ranging from −15 degrees to +15 degrees with 5 degrees increments. FIG. 5C shows simulated locations of the spots on the focal plane for wavelengths increasing from 750 nm (the points on top) to 850 nm (the points in bottom) at 10-nm steps, and angles from −15° (left) to +15° (right) at 5° separations. Focal spots (581, ..., 584) of FIG. 5C are magnified versions of focal spots (581', ..., 584') of FIG. 5B, respectively. FIG. 5D shows simulated spectral resolution and vertical full width half maximum (FWHM) versus wavelengths, calculated at multiple incident angles. The measured FWHM values for three wavelengths are also overlaid on the graph. FIG. 5E shows simulated angular resolution and FWHM versus wavelengths calculated for multiple incident angles. Measured horizontal FWHM values at three wavelengths are also overlaid on the graph.

Figure 6:
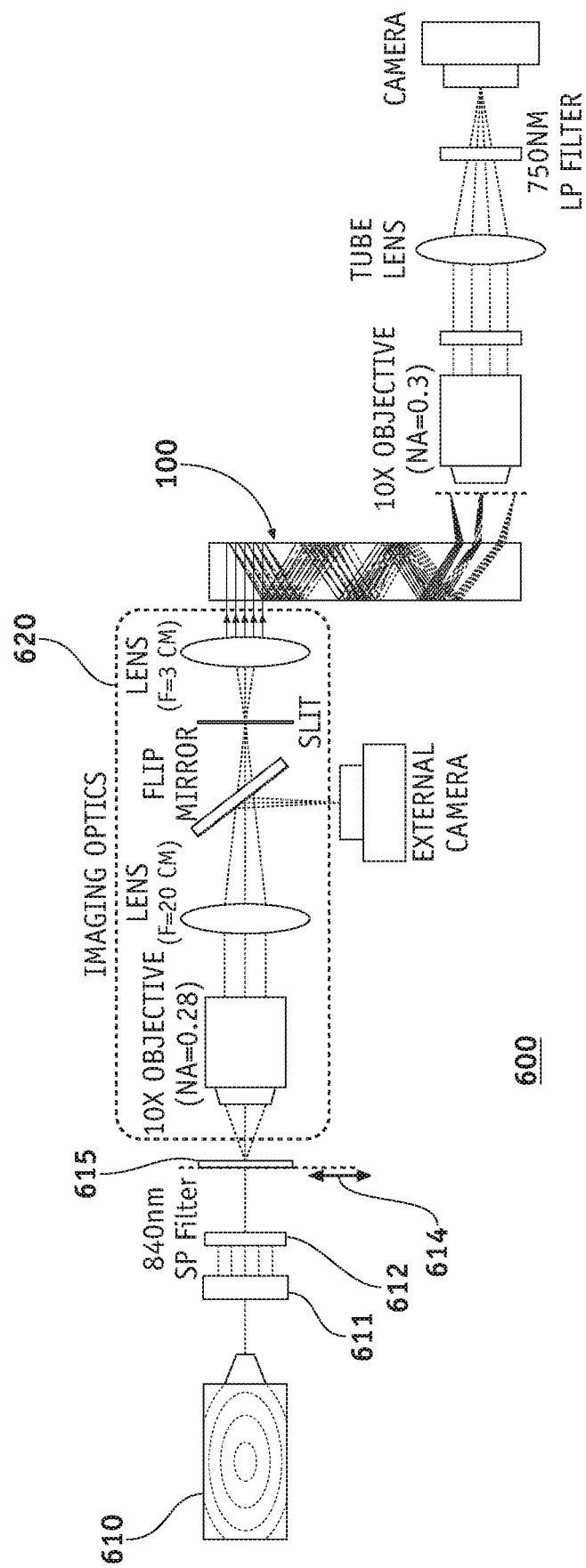
FIG. 6 shows an optical setup used to characterize hyperspectral imaging performed by an exemplary HIS according to embodiments of the present disclosure.

FIG. 6 shows an optical arrangement (600) to characterize hyperspectral imaging performed using HSI (100) of FIG. 1A. An imaging optics unit (620) is placed in front of the hyperspectral imager input aperture to map the points on one lateral scan of the object into collimated angles spreading within the range of −13 degrees to 13 degrees incident onto the HSI (100). A supercontinuum laser (610) is used to illuminate the object (615). Two filters (612), one short-pass (840 nm) and the other one long-pass (750 nm), are used to filter out of band light. The hyperspectral sample is then scanned by moving the object (615) using moving stage (614). At each step in the scan, the spectral data for different angles (−15 to +15 degrees) in the 750-840 nm are captured. The rate of capturing is 4 μm/scan (400 steps/seconds, where each step is about 10 nm and each scan has duration of 1 second), such that the whole sample is scanned in about 250 line scans.

Figure 7:
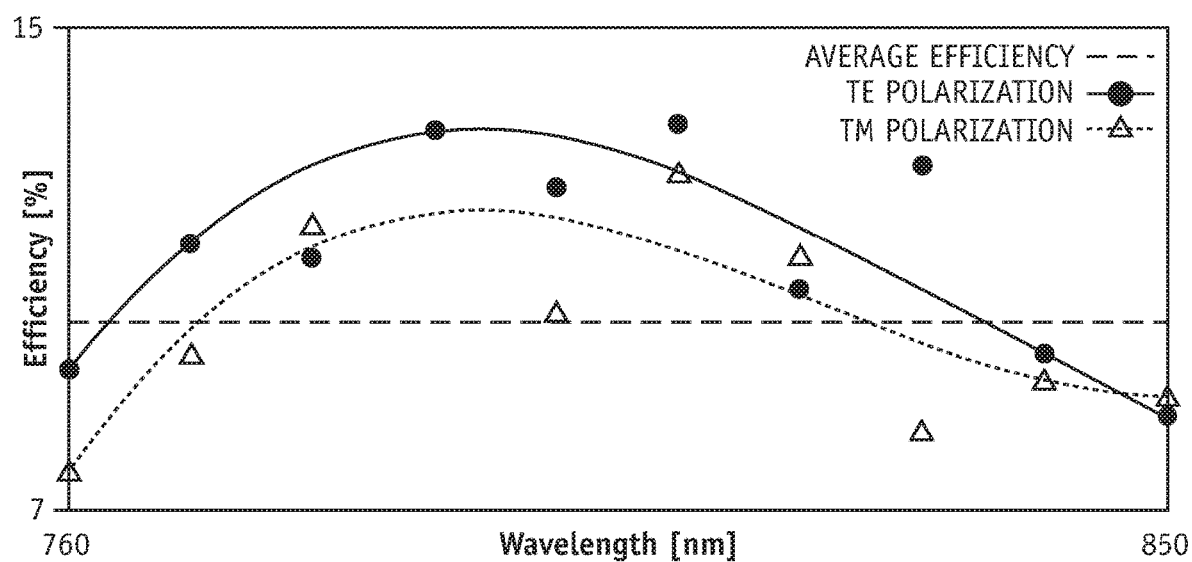
FIG. 7 shows focusing efficiency of an exemplary HSI according to embodiments of the present disclosure.

FIG. 7 shows focusing efficiency of an exemplary implementation of HSI (100) of FIG. 1A, versus wavelength, measured for both TE and TM polarizations. The symbols illustrate the measured data and the solid lines are eye guides.

Figure 8:
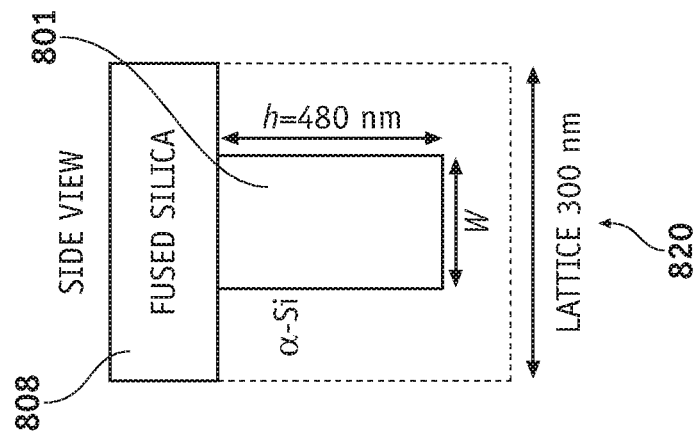
FIG. 8 shows an exemplary hyperspectral sample unit cell according to an embodiment of the present disclosure.
Figure 8:
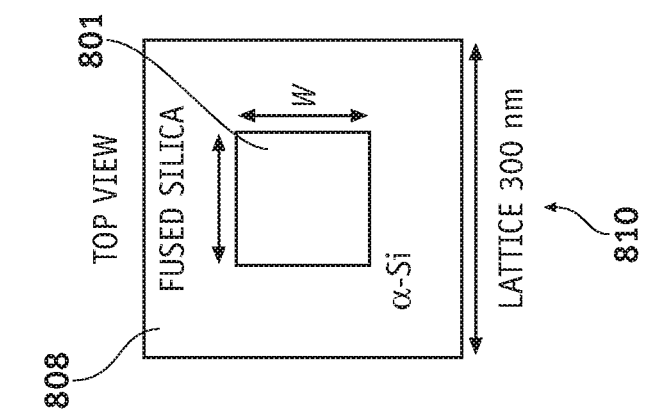
Figure 8:
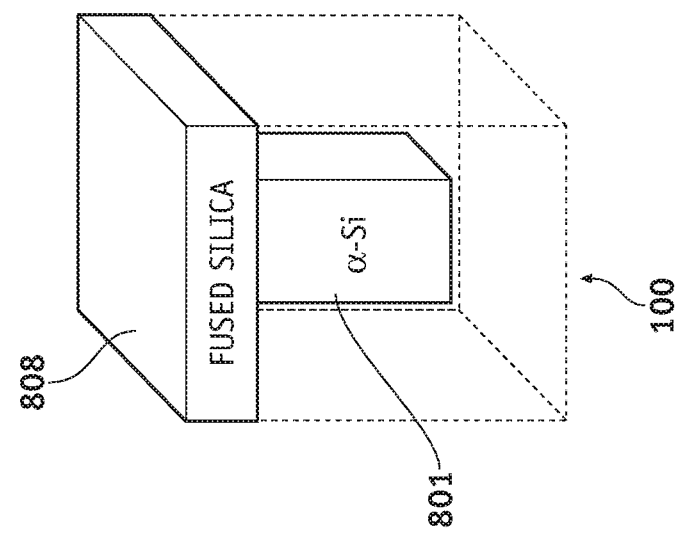

In order to characterize the performance of the methods and devices disclosed, a test hyperspectral sample was fabricated based on the teachings of the present disclosure. In order to build a hyperspectral sample with noticeable transmittance spectrum variation over its area, metasurface unit cell (800) shown in FIG. 8 was used. Also shown in FIG. 8 are the top view (810) and the side view (820) of unit cell (800). Unit cell (800) may comprise an α-Si nanopost (801) with rectangular cross-section, resting on fused silica substrate (808)

Figure 9:
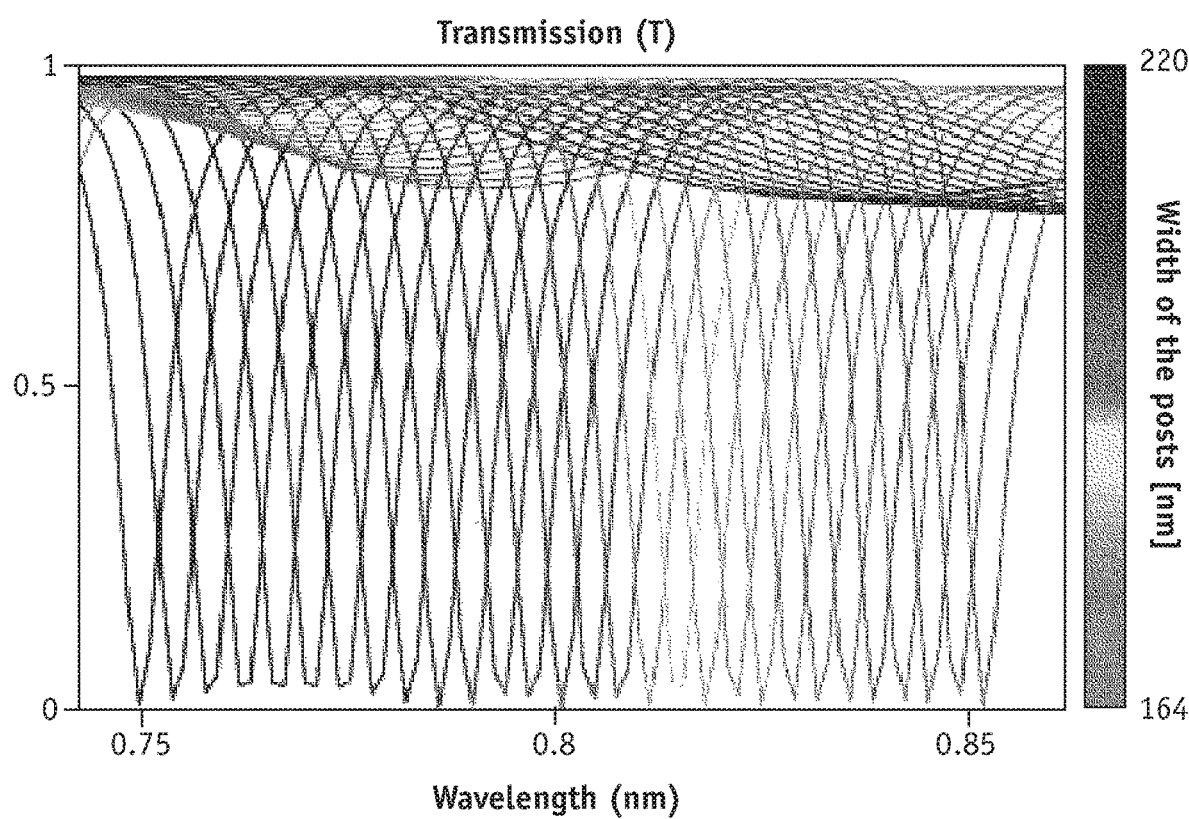
FIG. 9 show exemplary transmission spectra according to embodiments of the present disclosure.

FIG. 9 shows the transmission spectrum of a periodic array of the unit cells (800) of FIG. 8. The transmission spectrum shown in FIG. 9 was obtained by sweeping the side length from 164 nm to 220 nm, resulting in the transmission minimum moving from 750 nm to around 850 nm. As can also be seen in FIG. 9, in order to avoid unwanted diffraction and facilitate fabrications, the lattice constant and nanopost height were kept constant at 300 nm and 480 nm, respectively. Sweeping of the resonance wavelength according to FIG. 9 enables the realization of samples with spatial variations in their transmission spectrum.

Figure 10:
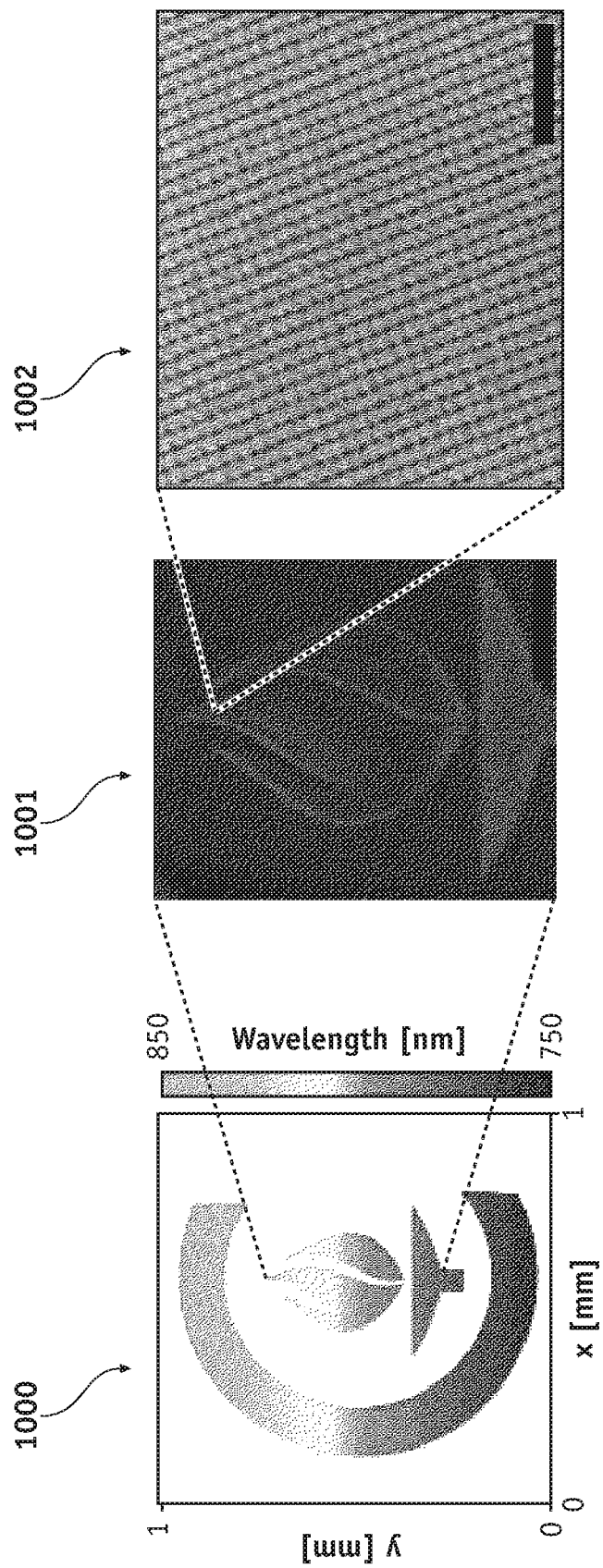
FIG. 10 shows an exemplary hyperspectral test sample according to embodiments of the present disclosure.

FIG. 10 shows an exemplary hyperspectral sample (1000) according to an embodiment of the present disclosure, using an array of unit cells (800) of FIG. 8. Also shown in FIG. 10 are scanning electron micrographs (1001, 1002) of part of the hyperspectral sample (1000). The scale bars are 100 µm and 2 µm for electron micrographs (1001, 1002) respectively.

FIG. 9 essentially represents an exemplary one to one correspondence of transmission spectra of a nanopost (or more in particular, dip wavelengths/minima of such transmission spectra) with various dimensions of such a nanopost. Using such correspondence, hyperspectral samples with nanoposts arranged based on set shapes with set color variations may be built in accordance with the teachings of the present disclosure. The person skilled in art will understands that, depending on the application, hyperspectral samples using unit cells with nanoposts having arbitrary side lengths and heights, and arranged based on arbitrary lattice constants or variable spacing may also be built in accordance with the embodiments of the present disclosure.

Figure 11:
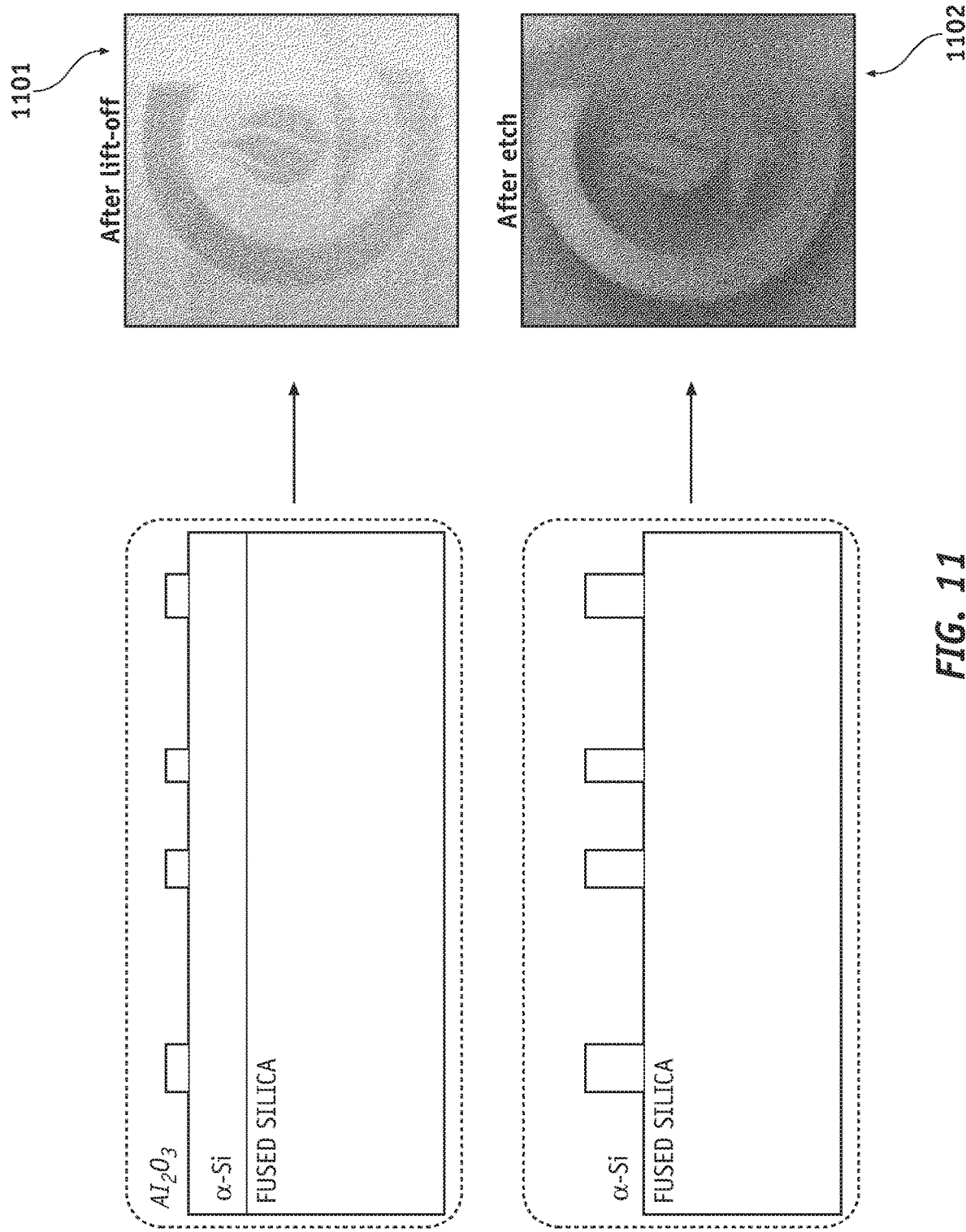
FIG. 11 shows exemplary optical images of a hyperspectral test sample according to embodiments of the present disclosure.

FIG. 11 shows optical images of the sample (1000) of FIG. 10 at two different fabrication steps, after lift-off (1101) and after etching (1102). The person skilled in the art will understand that the various specific dimensions as mentioned above with regards to unit cell (800) of FIG. 8 are exemplary dimensions and unit cells with any other dimensions in accordance with the teachings of the present disclosure may also be envisaged. The person skilled in art will also appreciate that hyperspectral test samples as disclosed may also be used to characterize any other hyperspectral imagers that are built differently from the ones disclosed throughout this document.

According to the teachings of the present disclosure, the same design principle and concept described above can also be applied to electromagnetic waves of any frequency range given the use of appropriate material systems and scaling the designs accordingly

The invention claimed is:

1. A hyperspectral imager (HSI) comprising:
a first mirror with an input aperture and a second mirror with an output aperture, the first and the second mirror facing each other; and
a plurality of reflective metasurfaces and a transmissive metasurface, the plurality of reflective metasurfaces and the transmissive metasurface being patterned on a side of the HSI closer to the second mirror, the transmissive metasurface being in correspondence of the output aperture;
wherein:
the input aperture is configured to input light of separate wavelengths received at incident angles;
the first mirror and the second mirror are configured to reflect the light to generate a reflected light;
the output aperture is configured to output the reflected light thus generating an output light; and
a combination of the plurality of reflective metasurfaces and the transmissive metasurface is configured to split the light into the separate wavelengths and to focus the output light to a plurality of spots on a focal plane.

2. The HSI of claim 1, wherein:
the incident angles are horizontal incident angles;
horizontal positions of the plurality of spots are in correspondence with the horizontal incident angles and
vertical positions of the spots are in correspondence with the wavelengths.

3. The HSI of claim 1, wherein the plurality of reflective metasurfaces comprises a grating configured to vertically disperse the light.

4. The HSI of claim 1, wherein each metasurface of the plurality of reflective metasurfaces and the transmissive metasurface comprises nanoposts.

5. The HSI of claim 1, wherein each incident angle corresponds to a point on a line of an image.

6. The HSI of claim 4, wherein lateral dimensions of the nanoposts are configured to render the plurality of reflective metasurfaces and the transmissive metasurface independent of polarization for a set operation angle.

7. The HSI of claim 4, wherein lateral dimensions of the nanoposts are configured such that a derivative of a phase of the reflected light with respect to wavelength is substantially equal to a constant.

8. The HSI of claim 2, wherein the horizontal incident angles are within a range of −15 to +15 degrees with respect to a center of the input aperture.

9. The HSI of claim 1 having a volume of less than 10 mm$^3$, a spectral and an angular resolution substantially equal to 1.5 nm and 0.075 degrees respectively.

10. The HSI of claim 3, wherein the nanoposts are made of silicon, the first and the second mirror are made of gold.

11. The HSI of claim 1, wherein the light wavelengths are within a range of 750 nm to 850 nm.

12. The HSI of claim 4, wherein heights of the nanoposts are constant and the nanoposts are arranged based on a set lattice constant or variable spacing.

13. The HSI of claim 12, wherein lateral dimensions of the nanoposts are within a range of 164 nm to 220 nm.

14. The HSI of claim 1, wherein the plurality of reflective metasurfaces and the transmissive metasurface are located on the second mirror.

* * * * *